United States Patent [19]
Stemberger

[11] Patent Number: 5,284,395
[45] Date of Patent: Feb. 8, 1994

[54] PROPORTIONALLY DIMENSIONED ROLLER BEARING

[76] Inventor: Ivan Stemberger, APP Carreo 870, Maracaibo, Venezuela

[21] Appl. No.: 942,901

[22] Filed: Sep. 10, 1992

[51] Int. Cl.$^5$ ............................................. F16C 33/34
[52] U.S. Cl. .................... 384/565; 384/450; 384/569
[58] Field of Search ............... 384/565, 450, 569, 584, 384/570, 567

[56] References Cited

U.S. PATENT DOCUMENTS

| | | | |
|---|---|---|---|
| 1,510,920 | 10/1924 | Bronander | 384/565 |
| 1,572,736 | 2/1926 | Mc Phail et al. | 384/565 |
| 1,672,012 | 6/1928 | Tyson | 384/565 |
| 4,265,497 | 5/1981 | Eickmann | 384/565 |

*Primary Examiner*—Lenard A. Footland
*Attorney, Agent, or Firm*—Malloy & Malloy

[57] ABSTRACT

A proportionally dimensioned roller bearing including a pair of co-axial rings with confronting track working surfaces and a plurality of equispaced rollers captivated between the track surfaces wherein each of the rollers has a central portion of a common outside diameter defining a working surface in close adjacent working relation to the working surface of the inner ring and a pair of spaced roller portions of a common outside diameter outboard of the central roller portion of a diameter greater than the diameter of the central portion of the roller and defining spaced working outboard roller surfaces and wherein the rollers and ring tracks are configured for working relation with one another and the central portion outside diameter dimension relative to the inner ring track diameter dimension being equally proportional to the outside diameter dimension of the outboard portions of the rollers relative to the inside track diameter dimension of the outer ring.

4 Claims, 1 Drawing Sheet

PROPORTIONALLY DIMENSIONED ROLLER BEARING

SUMMARY OF THE INVENTION

There have long been problems with bearings. Numerous efforts have been made to overcome these problems. One such problem involves roller bearing wherein, because the circumference of the outer track is longer than the circumference of the inner track, there is some scraping with attendant heat development where friction and loss of smooth operation occur.

By way of background, there is an increasing demand for better roller bearings to meet new technological requirements. In response to this demand, conventional roller bearings have been modified and improved, but problems still exist.

Most conventional roller bearings consist of three basic components: 1) a fixed outer ring with an inner track along which the rollers roll; 2) a fixed inner ring with an outer track spaced a uniform distance from the inner track along which the rollers roll; and 3) a plurality of rollers equally spaced and captivated in an annular gap between the periphery of the two confronting working tracks. Such roller bearings have been found to overheat at high speeds, to have wear and cause friction and, generally, fail to run smoothly. Generally, a basic factor for these problems is that the tracks, the inner track and the outer track, are of somewhat different dimensions so that the circumference in accordance with the formula 2 D is larger for one track than the other. This results in the track on the inside of the outer ring being somewhat longer than the outside track of the inner ring. Consequently, the roller cannot roll smoothly and without some binding. In other words, the ever-changing portion of the roller tangent to the point of contact with the outer ring rolls, it traverses a greater distance along that track on the outer ring than does the opposite diatrically opposed tangential surface rolling along the track of the inner ring. Therefore, there is some sliding with resultant friction of the rollers in order to equalize the travel. It can be said that a cause of this energy loss and inefficiency of the bearing is the difference in lengths of travel resulting from the difference in diameter between that of the inner track and the outer track of the bearing. This invention addresses this problem and provides a proportionally dimensioned bearing structure as explained herein.

Generally, a roller bearing according to this invention provides working surfaces, for a roller a first working central surface portion of a smaller diameter than second working surface portions extending outboard of the central portion. Because of the structural configuration of the rotating rollers relative to the length of the tracks on the surrounding rings, there is less binding in use. In other words, for each rotation of the rings relative to one another, the number of revolutions of each of the rotating rollers along each of the tracks on the rings may be the same.

More specifically and as explained more fully below, this invention is of a roller bearing which is proportionally dimensioned. The roller bearing comprises an outer ring having an inner track and a concentric inner ring having an outer track. Between these tracks, an annular gap is defined in which a plurality of equally spaced rollers of circular cross section are captivated. Each of the rollers has a pair of spaced outboard working surface portions of one diameter and a second intermediate or central portion with a working surface of another and smaller diameter. These working surfaces closely confront the corresponding working surfaces on the outer and inner rings respectively. There is compensation for the differences in the circumferential length of the two opposing tracks because of a structure wherein the ratio of the lengths a) of the diameters of the working surfaces of the central roller portion and that of the working surface of the inner ring, b) to the ratio of the lengths of the diameter of the working surfaces of the roller outboard portions and that of the working surfaces of the outer ring. They are equally proportional. Thus, for each rotation of the inner ring relative to the outer ring, there may be the same number of revolutions of the working surface of the roller traveling tangentially to the tracks, irrespective of whether traveling along the track of the inner or the outer ring, in other words, the same ratio of revolutions of the two different working surfaces of each roller.

Accordingly, this invention has an object the provision of a proportionally dimensioned bearing and more specifically a roller bearing which includes A) a pair of concentric rings, an inner ring and outer ring each with a working surface confronting one another, and B) a plurality of equally spaced rollers of circular cross section captivated between the rings wherein each of the rollers is of common size and shape and each roller has a) a central portion of a first common outside diameter and b) a pair of spaced outboard roller portions of common outside diameter extending oppositely or outboard from the central roller portion so as to define a pair of outer outboard working surfaces and c) wherein the central portion outside diameter dimension ratio relative to the dimension of diameter of the working surface of the inner ring is the same as or equally proportional to the ratio of the outside diameter dimension of the pair of outboard portions of the roller relative to the dimension of the diameter of the working surface of the outer ring. In accordance with this general object and other objects which will become apparent in view of this disclosure, the proportionally dimensioned bearing will now be described on reference to the accompanying drawings.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
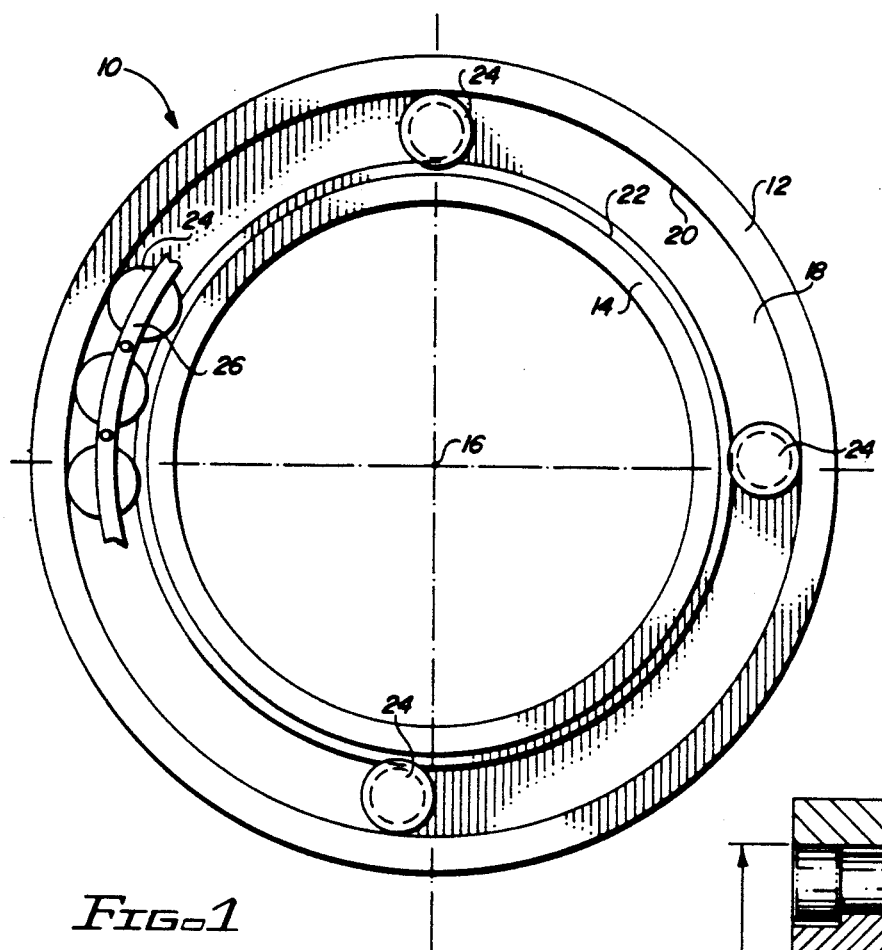
FIG. 1 is a side view of a bearing constructed in accordance with this invention.

Referring to the drawings wherein like reference characters designate like or corresponding parts throughout the several views, there is shown a proportionally dimensioned bearing generally designated by the numeral 10. It includes an outer ring 12 and an inner ring 14. The rings are concentric about a common axis generally designated by the numeral 16 and there is defined between these rings a gap generally designated by the numeral 18 which is annular. The outer ring 12 has an inner working track or surface as is conventional and which is designated by the numeral 20. Similarly, the inner ring has an outside working surface 22 of a common second diameter which is less than the working surface diameter of the outer ring. Such tracks are conventional as is indicated in the drawings and rollers one of which is generally designated by the numeral 24 are captivated in the gap 18 between the inner and outer ring working surfaces 20 and 22. Conventionally, the rollers comprise a plurality of equally spaced, equally sized generally cylindrical members of circular cross section, being joined together by a member such as 26. Each of the rollers each has an axis parallel to the axis of the concentric rings.

Figure 3:
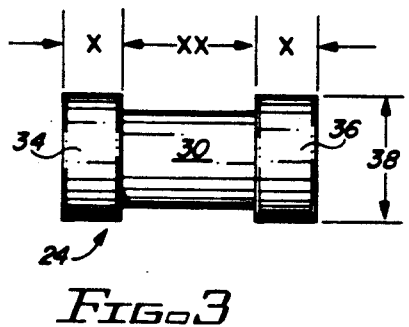
FIG. 3 is a elevational view of one of the bearing rollers.
Figure 2:
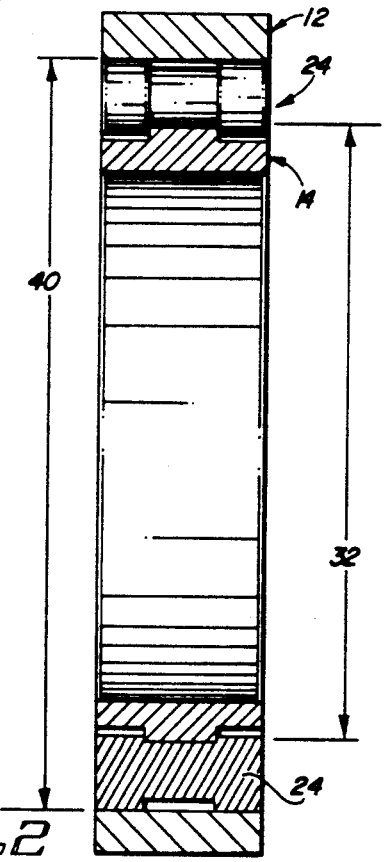
FIG. 2 is a view in cross-section taken on the plane indicated by the line 2—2 of FIG. 1.

Referring now to FIG. 3, it is seen that the rollers of this invention are circular in cross section, and as seen in FIG. 2, are captivated in the gap between the two rings with their surfaces confronting and in close adjacent working relationship the tracks of the rings. With continuing reference to FIG. 3, each of the rollers is seen to have a central portion 30 of a common outside diameter. The central portion outside diameter is of course less than the diameter indicated by the numeral 32 of the working surface of the inner ring 14. Each of the rollers also has a pair of spaced roller portions of common outside diameter located outboard of the central portion 30. These outboard roller portions are designated by the numerals 34 and 36. It is seen that the outside diameter indicated by the numeral 38 is larger than the diameter of the central portion 30. The diameter of the working surface of the outer ring which mates with the working surface of the outboard portions 34 and 36 is indicated by the numeral 40. In this proportionally dimensioned bearing, the diameter of the central portion 30 of the roller in relation to the dimension of the diameter 32 defines a ratio which is the same as, that is equal to the ratio between the diameter 38 of the outboard portions 34 and 36 and the dimension of the diameter 40 of the working surface of the outer ring 12. Since the ratios are the same, the rollers in order to travel one revolution in the gap will not tend to slide but will roll relatively smoothly making generally the same number of revolutions reducing the tendency to bind and scrape.

As seen in FIG. 3, the sum of the axial lengths of the outer portions 34 and 36 is preferably equal to the axial length of the central portion 30 of the roller. As is well-known in the bearing art, the lubrication between confronting working surfaces is usually in the order of about 0.001" and 0.003" and this is a matter of choice by the actual manufacturer of the bearing.

By way of an example, if the diameter 40 of the working surface of the outside ring 12 were to be 150 millimeters, and the diameter of the working surface of the inner ring 32 were to be 122.73 millimeters, then, in order to have to ten revolutions of each roller per revolution of the outer ring relative to the inner ring, the diameter of the outboard portions 34 and 36 would be 15 while the diameter of the central portion of each roller would be 12.273. Such a proportionally dimensioned bearing would then call for a travel of ten revolutions of each roller in order to move circumferentially relative to the inner and outer ring in the gap between those rings. There could be a family of bearings each characterized by this 1 to 10 ratio which would be indicated as follows:

| Outer ring diameter | | Roller diameters | |
| --- | --- | --- | --- |
| 150 | 122.73 | 15 | 12.273 |
| 100 | 81.82 | 10 | 8.18 |
| 80 | 65.45 | 8 | 6.54 |

In operation, this proportionally dimensioned bearings offers a working ratio with proportionally equal diameters. Thus, the travel of the rotating roller along both of the tracks in the gap between the surrounding rings may be substantially the same. The special design of this bearing allows it to rotate with less limitations on speed or load because of the differences between the track lengths are neutralized.

Generally, the proportionally dimensioned bearing is a cylindrical-type roller bearing with a stepped outer diameter creating a central portion of less diameter than outboard portions. The tracks on both rings are designed in proportion to the roller that rotates between them.

While this invention has been shown and described in what is considered to be the a practical and preferred embodiment, it is recognized that departures may be made within the spirit and scope of this invention which should, therefore, not be limited except as set forth in the claims hereinafter and within the doctrine of equivalents.

What is claimed is:

1. A roller bearing comprising a pair of rings having a common axis including:

an outer annular ring having an inside working surface of a common first diameter, an inner annular ring having an outside working surface of a common second diameter less than said first diameter, said working surfaces of said inner and outer rings defining an annular gap therebetween, a plurality of equally spaced rollers of circular cross-section captivated in the gap, each of said rollers being of a common size and shape and each having an axis parallel to the axis of said rings, said rollers having a central portion of common outside diameter, said common outside diameter being less than spaced roller diameter portions and defining a working surface in close adjacent working relation to said working surface of said inner ring, a pair of said spaced roller portions of common outside diameter extending oppositely from said central portion and defining a pair of outer portion working surfaces each in close adjacent working relation to the working inside surface of said outer ring, said outer diameter of said pair of outer portions being greater than said diameter of said central portion, and said central portion outside diameter dimension relative to said second diameter being equally proportional to the outside diameter of said pair of outer portions relative to said first diameter.

2. A roller bearing as set forth in claim 1 wherein each of said pair of spaced roller portions is of a common axial length.

3. A roller bearing as set forth in claim 1 wherein said pair of spaced roller portions are of an axial length substantially equal to the axial length of said central portion.

4. A roller bearing as set forth in claim 1 wherein said close adjacent working relation is between about 0.001" and 0.004" comprising working space means for lubrication of the bearing.

* * * * *